United States Patent Office 3,784,550
Patented Jan. 8, 1974

3,784,550
N-[2,3 - DIHYDROQUINOBENZOXA(OR THIA)
ZEPIN - 3 - YLIDENE] - O-(SUBSTITUTED
BENZOYL)HYDROXYLAMINES
Harry L. Yale, New Brunswick, and Ramesh B. Petigara, Somerset, N.J., assignors to E. R. Squibb & Sons, Inc., Princeton, N.J.
No Drawing. Filed Aug. 13, 1971, Ser. No. 171,731
Int. Cl. C07d 39/00
U.S. Cl. 260—287 R          8 Claims

ABSTRACT OF THE DISCLOSURE

Esters of 1,2-dihydroquinobenzoxa(or thia)zepin-3-one, oximes are provided having the structures

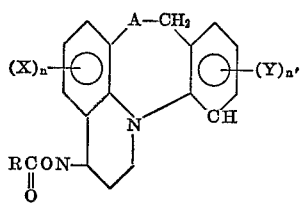

or

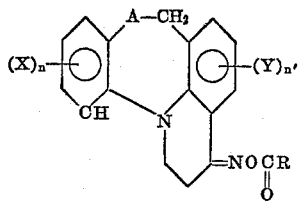

wnerein A is O or S; X and Y are the same or different and can be halogen, trifluoromethyl, lower alkyl, cycloalkyl, lower alkylmercapto, lower alkyloxy, cyano, isocyanido or di-lower alkylsulfamoyl; R is lower alkyl, aryl, arylalkyl, arylalkenyl, aminoaryl, aminoalkyl, piperidyl, furyl or pyridyl; $n$ is 0, 1, or 2; and $n'$ is 0, 1, or 2; and pharmaceutically acceptable acid-addition salts thereof. These compounds are useful as central nervous system stimulants, muscle relaxants, anti-inflammatory agents, and antibacterial agents.

The present invention relates to esters of 1,2-dihydroquinobenzoxa(or thia)zepin-3-one oximes of the structure

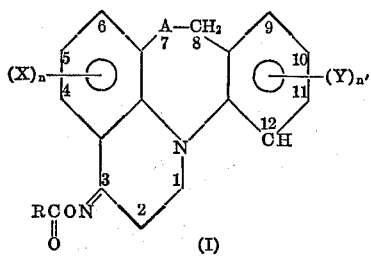

or

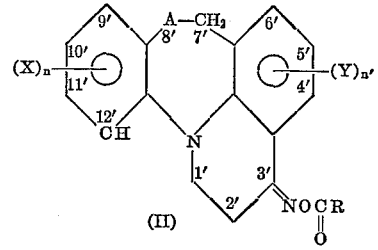

wherein X and Y are the same or different and can be halogen, trifluoromethyl, lower alkyl, cycloalkyl, lower alkylmercapto, lower alkyloxy, cyano, isocyanido or di-lower alkylsulfamoyl, R is lower alkyl, aryl, arylalkyl, arylalkenyl, aminoaryl, aminoalkyl, piperidyl, furyl or pyridyl. A is O or S, $n$ is 0, 1 or 2 and $n'$ is 0, 1 or 2, and pharmaceutically acceptable acid-addition salts thereof.

The term "lower alkyl" as employed herein includes both straight and branched chain radicals of up to and including eight carbon atoms, for instance, methyl, ethyl, propyl, isopropyl, butyl, s-butyl, t-butyl, pentyl, hexyl, isohexyl, heptyl, 4,4-dimethylpentyl, octyl, 2,2,4-trimethylpentyl and the like. The lower alkyl group can include substituents such as aryl.

The term "halogen" includes F, Cl, Br or I.

The lower alkylmercapto groups contain up to eight carbon atoms and include methylmercapto, ethylmercapto, propylmercapto and mercapto radicals containing any of the lower alkyl groups mentioned hereinbefore.

The terms "lower alkyloxy" and "lower alkoxy" are interchangeable and refer to groups containing up to eight carbon atoms and which include any of the lower alkyl groups mentioned hereinbefore attached to an oxygen atom.

The term "cycloalkyl" includes saturated ring systems which contain from three to seven carbons such as cyclopropyl, cyclobutyl, cyclopentyl, cyclohexyl and cycloheptyl.

The term "alkenyl" includes mono-unsaturated straight chain or branched chain radicals of less than eight carbons corresponding to "lower alkyl" as defined above.

The amino groups include mono- or di-lower alkyl-, arylalkyl-, lower alkylaryl- or arylamino wherein lower alkyl and aryl are as defined herein, such as methylamino, ethylamino, isopropylamino, heptylamino, dimethylamino, diethylamino, ethylmethylamino, butylmethylamino, ethyl i-propylamino, anilino, benzylamino, diphenylamino, naphthylamino, or N-methyl-N-phenylamino and the like.

The term "aryl" as employed herein include monocyclic carbocyclic aryl radicals, for instance, phenyl and substituted phenyl radicals, such as lower alkyl or alkoxy phenyl (e.g., o-, m- or p-tolyl, ethylphenyl, butylphenyl and the like, di(lower alkyl)phenyl (e.g., 2,4-dimethylphenyl, 3,5-diethylphenyl and the like and corresponding alkoxy compounds), halophenyl (e.g., chlorophenyl, bromophenyl, iodophenyl, fluorophenyl), o-, m- or p-nitrophenyl, dinitrophenyl, (e.g., 3,5-dinitrophenyl, 2,6-dinitrophenyl and the like), and trinitrophenyl (e.g., picryl), aminophenyl, such as p-dimethylaminophenyl.

In the above Formulae I and II, each of the carbocyclic aromatic rings can include 0, 1 or 2 substituents, other than hydrogen. The nature and position of the substituents in the starting materials will determine which isomer, Type I and/or Type II, is obtained.

The salts of the compounds of this invention include the acid-addition salts where basic groups are present, particularly the non-toxic acid-addition salts. Acids useful for preparing the acid-addition salts, include inter alia, inorganic acids, such as the hydrohalic acids (e.g., hydrochloric and hydrobromic acid), sulfuric acid, nitric acid and phosphoric acid, or organic acids, such as oxalic, maleic, fumaric, tartaric, citric, pamoic, acetic, and succinic acid.

As will be seen hereinafter, the compounds of the invention are prepared from starting materials of the structure (III)

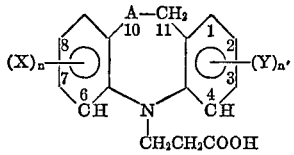

Where the starting material III, $n$ is 1 or 2 and X includes a strongly electronegative group like trifluoromethyl, cyano, isocyanido or di-lower alkylsulfamoyl substituent at the 7-position, and $n'$ is 0, or Y is a substituent at a position other than 3 and 4 in the starting material, cyclization is directed to the 4-position so that the Type II isomer is subsequently formed. However, where X is an ortho-para orienting group like halogen, especially chlorine, and $n$ is 1 or 2 and at least one halogen is at the 7-position of starting material III, or Y is lower alkyl, lower alkyloxy, cycloalkyl or lower alkylmercapto at any position or a strongly electronegative group at a position other than 3, or when $n'$ is 0, a mixture of the Type I and Type II isomers is obtained.

Where in the starting material III, $n'$ is 1 or 2 and Y includes a strongly electronegative group like trifluoromethyl, cyano or di-lower alkylsulfamoyl at the 3-position, and $n$ is 0 or X is a substituent at a position other than 7 in the starting material, cyclization is directed to the 6-position so that the Type I isomer is subsequently formed.

Where in the starting material III, $n'$ is 1 or 2 and Y includes an ortho-para orienting substituent at the 3-position, and $n$ is 0, or X is a substituent at a position other than 7 in the starting material, cyclization is directed to the 6-position so that the Type I isomer is subsequently formed.

Where $n$ and $n'$ are 0, that is where there are no substituents on either aromatic ring, the Type I isomer is obtained, that is (IV)

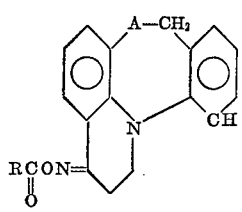

Where the starting material does not include substituents at the 3 and 7 positions, but does include substituents such as lower alkyl, lower alkyloxy, cycloalkyl or lower alkylmercapto at the 2, 8 and/or 9 positions, the Type I isomer is obtained.

Where the starting material does not include substituents at the 3 and 7 positions, but does include strongly electronegative groups at the 1 and/or 9 positions, the Type I isomer is obtained. However, where the starting material includes a strongly electronegative group at the 2 and/or 8 positions, then a mixture of the Type I and Type II isomers is obtained.

Where X represents a strongly electronegative group like trifluoromethyl, cyano or di-lower alkylsulfamoyl and $n$ is 1 or 2 at least one X being at the 7-position of the starting material and Y is lower alkyl, lower alkylmercapto, cycloalkyl or lower alkoxy at any position or any of the above strongly electronegative groups at a position other than 3 in the starting material and $n$ is 0, 1 or 2, the Type II isomer is obtained.

Where X is lower alkyl, lower alkyloxy, cycloalkyl, or lower alkylmercapto and $n$ is 1 or 2 and Y is halogen, trifluoromethyl, cyano, isocyanido or di-lower alkylsulfamoyl, and $n'$ is 1 or 2 at least one Y being at the 3-position of the starting material, the Type I isomer is obtained. In this case, X can be trifluoromethyl or other strongly electronegative group so long as it is not in the 7-position of the starting material as will be seen hereinafter.

Where X is lower alkyl, lower alkyloxy, cycloalkyl or lower alkylmercapto, and $n$ is 1 or 2 and $n'$ in $(Y)_n$, is 0, the Type I isomer is obtained.

Where Y is lower alkyl, lower alkyloxy, cycloalkyl or lower alkylmercapto and $n'$ is 1 or 2 and the $n$ in $(X)_n$ is 0, the Type II isomer is obtained.

Where both X and Y represent lower alkyl, lower alkoxy and/or lower alkylmercapto, at least one of said groups being at the 3 and 7 positions of the starting material, the Type I isomer is obtained.

Preferred are those compounds of Formula I wherein $n=0$ and $n'=0$ and $A=O$; those compounds of Formula I wherein $n=0$, $n'=1$ and Y is Cl at the 11-position, and $n=1$, $n'=0$ and X is Cl at 4 position and $A=O$ and those compounds of Formula II wherein $n=1$, X is $CF_3$ or Cl at the 11'-position, $n'=0$, and $A=O$.

The compounds of the invention of Formulae I and II can be prepared by reacting an oxime of Formula V or VI

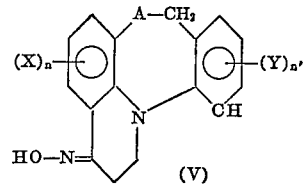

or

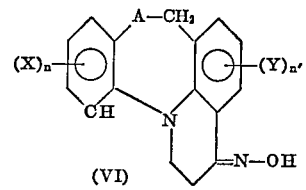

with a base, such as a metal hydride, for example sodium hydride, an alkali metal alkoxide, such as sodium methoxide, sodium ethoxide, potassium methoxide or sodium t-butoxide or a metal amide, such as sodium amide or amine such as triethylamine in a non-protic solvent such as benzene, toluene, xylene, hexane, heptane, cyclohexane, ethyl ether, tetrahydrofuran, dioxane, etc., to form the corresponding anion.

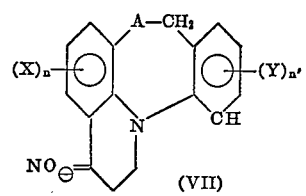

or

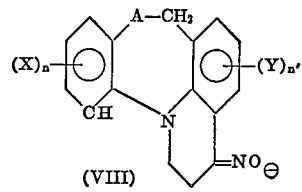

and reacting the anion VII or VIII with an acylating agent such as an acyl halide of the structure (IX)       

wherein Q is Cl or Br or an acid anhydride of the structure (X)        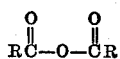

to form compounds of structures I or II, at a temperature within the range of from about 50° to about 150° C., employing a molar ratio of VII or VIII:IX within the range of from about 0.5:1 to about 1:1 or a molar ratio of VII or VIII:X within the range of from about 0.5:1 to about 1:1.

Alternatively, compounds of structures I and II can be prepared by reacting oxime V or VI with a base as described above and then reacting the anion with an ester of an acid having the structure (XI)       

wherein $R^1$ is lower alkyl of 1–4 carbon atoms, but preferably methyl or ethyl, in a non-protic solvent as described above, at a temperature within the range of from about 70 to about 150° C., employing a molar ratio of VII or VIII:XI of within the range of from about 0.4:1 to about 1:1.

The oxime starting materials of the invention can be prepared by reacting a compound of the structure.

(III)      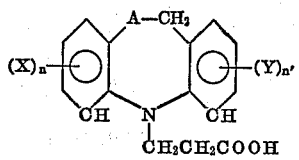

wherein X, Y, n, n', and A are as defined hereinbefore, with a phosphorus pentahalide, such as phosphorus pentachloride, in a molar ratio of III:pentahalide of within the range of from about 0.9:1 to about 1:1, in the absence of oxygen, and in the presence of an inert solvent, such as benzene, toluene, xylene, pentane, hexane, etc., at a temperature within the range of from about 0 to about 10° C., to form an acyl halide of the structure (XII)      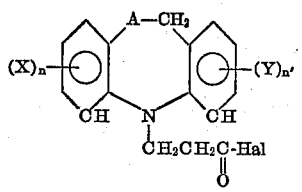

The acyl halide XII is reacted with anhydrous stannic chloride in a molar ratio of acyl halide XII:stannic chloride within the range of from about 0.4:1 to about 1:1, at a temperature within the range of from about 0° to about 30° C. to form the Formulae XIII and XIV, 3 or 3'-one compounds depending upon the nature and the position of the X and Y substituents.

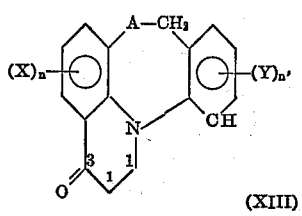
(XIII)

or

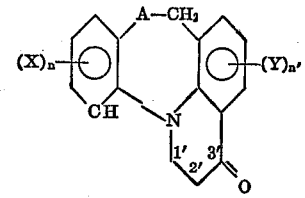
(XIV)

The compounds of Formula XIII and/or XIV can also be prepared by reacting the starting material (III)      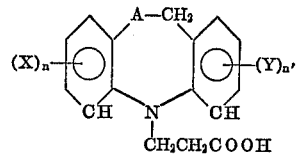

with trifluoroacetic anhydride or phosphorus pentoxide, in a molar ratio of III:trifluoroacetic anhydride, or phosphorus pentoxide of within the range of from about 0.9:1 to about 1:1, in the presence of an inert solvent such as benzene, toluene, xylene, pentane, hexane, etc., at a temperature within the range of from about 10° to about 80° C.; or with polyphosphoric acid (PPA) in a molar ratio of III:PPA of within the range of from about 1:10 to about 1:25.

The ketones of Formulae XIII and XIV react with hydroxylamine or the hydrohalide salt thereof in the presence of a solvent such as ethanol, methanol, etc., to give the corresponding oxime starting materials, that is

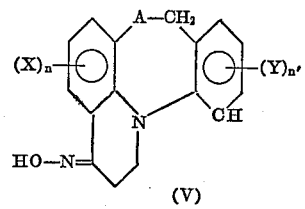
(V)

or

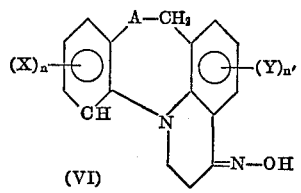
(VI)

The starting materials for Formula III are prepared by a sequence of reactions. One step comprises reacting compounds having the Formula XV:

(XV)       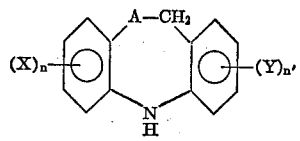

with acrylonitrile to yield compounds of Formula XVI (XVI)      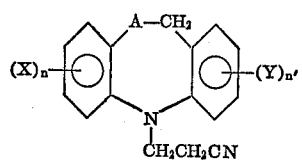

wherein n, n', X, Y and A are as defined herein.

This reaction is carried out by employing an excess of acrylonitrile as the solvent. The temperature utilized in the reaction can be varied from about 0° to about 100° C. with the preferred range being between about 0° and about 75° C. This reaction proceeds expeditiously when a small amount (up to about 1%) of a strong base like sodium hydroxide, sodium methoxide, potassium t-butoxide, or benzyl trimethylammonium hydroxide (Triton B) is used as the catalyst.

The next step for preparing compounds of Formula III is to treat the compounds of structure XVI with alcoholic hydrogen halide, such as hydrogen chloride in methanol, ethanol, and so forth, at room temperature whereby esters of the structure XVII are formed.

(XVII)
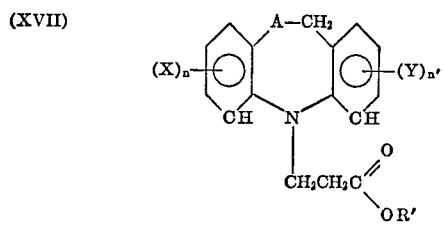

wherein R' is lower alkyl.

By saponifying compound XVII with an alkali metal hydroxide, e.g., potassium hydroxide, lithium hydroxide, and so forth, the desired carboxylic acids of structure III can be recovered.

Examples of compounds of Formula XV where A is S are set out in U.S. Pats. No. 3,188,321 and No. 3,188,322.

Examples of compounds of Formula XVI where A is O or S can be found in a paper entitled Novel Polycyclic Heterocycles, by Yale et al., J. Med. Chem. 13, 713 (1970).

Examples of starting materials which can be employed in preparing the compounds of the invention include, but are not limited to, the following wherein A can be O or S.

(1)
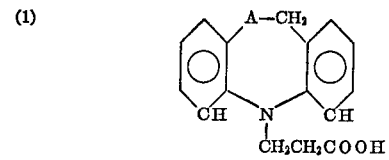

(2)
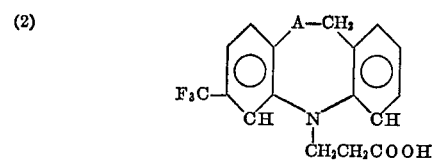

(3)
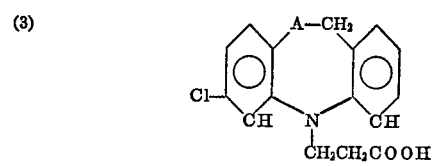

(4)
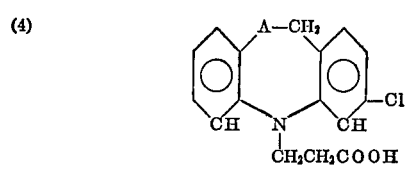

(5)
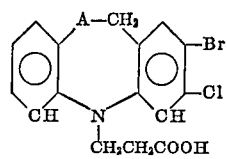

(6)
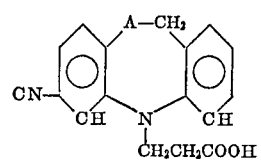

(7)
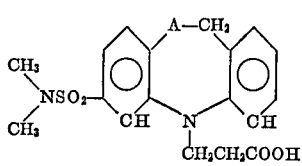

(8)
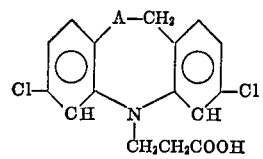

(9)
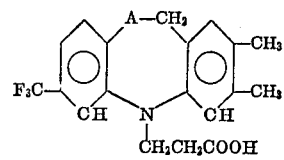

(10)
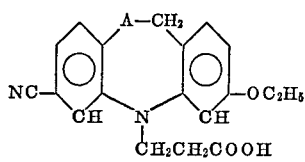

(11)
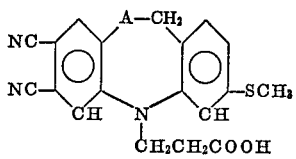

(12)
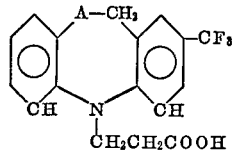

(13)
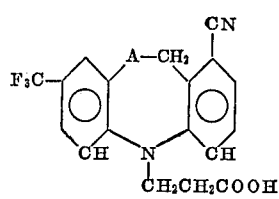

(14) 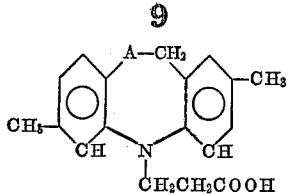

(15) 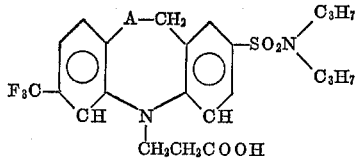

(16) 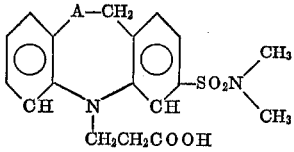

(17) 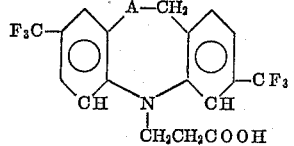

(18) 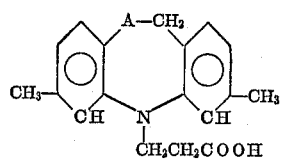

(19) 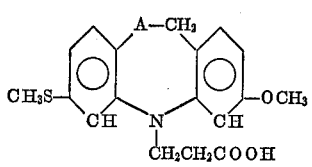

(20) 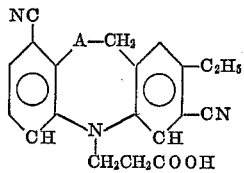

(21) 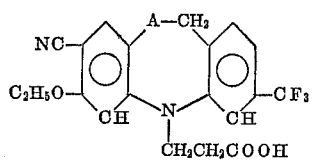

(22) 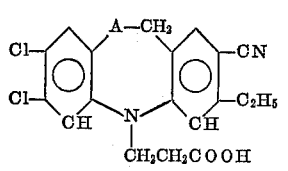

(23) 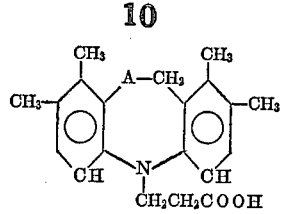

Compounds of this invention are therapeutically active compounds which are utilizable as central nervous system stimulants, as muscle relaxants and as anti-inflammatory agents. For these purposes, they may be administered orally or parenterally in such form as tablets, capsules, injectables, or the like by incorporating the appropriate dosage of the compound with carriers according to accepted pharmaceutical practices.

The new compounds of Formulae I and II are also useful as antimicrobial agents and may be used to combat infections in animal species, such as mice, rats, dogs, guinea pigs and the like, due to organisms such as *Trichomonas vaginalis, Trichomonas foetus, Staphyloccocus aureus, Salmonella schottmuelleri, Klebsiella pneumoniae, Proteus vulgaris, Escherichia coli, C. albicans* or *Trichophyton mentagrophytes*. For example, a compound or mixture of compounds of Formulae I and II may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor, etc., as called for by accepted pharmaceutical practice. They may also be applied topically, e.g., to dermatophytosis in a guinea pig, in a lotion, salve or cream at a concentration of about 0.01 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

EXAMPLE 1

N-[2,4-dihydro-11-(trifluoromethyl)-1H,7H - quino[8,1-cd][1,5]benzoazepin-3-ylidene]-O-(3,4,5 - trimethoxybenzoyl)hydroxylamine (A) 5,11-dihydro-7-(trifluoromethyl)dibenz[b,e][1,4]oxazepine-5-propionic acid: To 50.0 g. of 5,11-dihydro-7-(trifluoromethyl(dibenz[b,e][1,4]oxazepine in 60 ml. of redistilled acrylonitrile is added in 5 minutes 0.80 ml. of Triton B. Subsequently, the mixture is heated for one hour under reflux and the product isolated by extraction with benzene to give 5,11-dihydro-7 - (trifluoromethyl)dibenz[b,e][1,4]oxazepine-5-propionitrile, M.P. about 161–163°.

7 - (trifluoromethyl) - 5,11 - dihydrodibenz[b,e][1,4]oxazepine-5-propionitrile, 15.0 g., is dissolved in 240 ml. of dry dioxane and to this 140 ml. of 30% methanolic hydrogen chloride is added. The solution is stirred for 36 hours; 6 ml. of H₂O is added, stirred 0.5 hour, and then concentrated in vacuo to 120 ml. The solid is filtered, and the filtrate is concentrated to dryness in vacuo. The residual liquid is taken up in 200 ml. of diethyl ether, treated with Darco and Hyflo, the diethyl ether solution concentrated and the residue distilled in vacuo to give 5,11-dihydro-7-(trifluoromethyl)dibenz[b,e][1,4]oxazepine-5 - propionic acid, methyl ester, B.P. about 166–168° (0.08 mm.), M.P. about 70.0–71.5°.

7 - (trifluoromethyl) - 5,11 - dihydrodibenz[b,e][4,1]oxazepine-5-propionic acid, methyl ester, 3.15 g., is dissolved in 315 ml. of methanol and to this 0.5 g. of potassium hydroxide dissolved in 25 ml. of water is added. The mixture is refluxed for 2.5 hours and then concentrated in vacuo. The residue is taken up in 250 ml. of water and this solution is acidified with 2% aqueous HCl to give 5,11-dihydro-7-(trifluoromethyl)dibenz[b,e][1,4]oxazepine - 5-propionic acid, M.P. about 94–96°; this is recrystallized from 300 ml. of hexane to give about 2.7 g. of the product, M.P. about 105–107°.

(B) 1,2-dihydro-11-(trifluoromethyl)-3H,7H-quino[8,1-c,d][1,5]benzoxazepin-3-one: A solution of 6.86 g. of 5,11-dihydro-7 - (trifluoromethyl)dibenz[b,e][1,4]oxazepine-5-propionic acid in 50 ml. of benzene is cooled to 5–10°. oT this is added dropwise with stirring a solution of 4.6 g. of PCl₅ in 25 ml. of benzene over a period of 15 minutes. The solution is stirred at 25° for 40 minutes and then at 40–50° for another 20 minutes. The reaction mixture is then heated at 55° for 10 minutes, cooled to 10° and to this is added dropwise with stirring a solution of 12.0 g. anhydrous stannic chloride in 20 ml. of benzene. After stirring 20 minutes at 10° and 20 minutes at room temperature, 100 ml. of ether are added, followed by 10 ml. of concentrated hydrochloric acid, and then 100 ml. of water. After stirring vigorously for 10 minutes, the organic phase is separated, and the aqueous phase is extracted with 100 ml. of ether. The combined organic extracts are washed, dried, filtered and concentrated to dryness to give 6.9 g. of residue; this is crystallized from 2-propanol to give 4.3 g. of product, M.P. about 140–142°.

(C) 1,2-dihydro-11-(trifluoromethyl)-3H,7H - quino[8,1-cd][1,5]benzoxazepin-3-one, oxime: A solution of 28.0 g. of 1,2-dihydro-11-(trifluoromethyl)-3H,7H-quino[8,1-cd][1,5]benzoxazepin-3-one and 13.6 g. of hydroxylamine hydrochloride in 600 ml. of warm 70% ethanol is refluxed for 4 hours and cooled at room temperature to give a pale yellow crystalline solid. This is filtered and recrystallized from 70% ethanol to give 21.0 g. of the oxime, M.P. about 198–200° (dec.).

(D) N-[2,3-dihydro-11-(trifluoromethyl)-1H,7H-quino[8,1-cd][1,5]benzoxazepin-3-ylidene]-O - (3,4,5 - trimethoxybenzyl)hydroylamine: To a suspension of 8.35 g. of 1,2-dihydro-11-(trifluoromethyl)-3H,7H-quino[8,1-cd][1,5]benzoxazepin-3-one, oxime in 120 ml. of toluene, is added 1.3 g. of 50% sodium hydride and the mixture is heated under reflux for 1 hour, then cooled to 15–20° and to this added, dropwise, a solution of 8.0 g. of 3,4,5-trimethoxybenzoyl chloride in 50 ml. of toluene. The mixture is heated under reflux for 3 hours, then cooled and filtered to give 12.1 g. of a solid. The solid is recrystallized from 400 ml. of benzene to give about 9.9 g. of the product, M.P. about 218–220° (dec.).

EXAMPLE 2

N-[11-chloro-2,3-dihydro-1H,8H - quino[1,8 - ab][4,1]benzothiazepin-3-ylidene]-O-(p - dimethylaminobenzoyl)hydroxylamine (A) 3-chloro-5,11-dihydrodibenzo[b,e][1,4]thiazepine-pine-5-propionic acid: A suspension of 24.6 g. of 3-chloro-5,11-dihydrodibenzo[b,e][1,4]thiazepine in 55 ml. of acrylonitrile is cooled to 0–5°. To this is added dropwise 0.3 ml. of Triton B. The temperature rises slowly from 3° to 14° and then rapidly to 45° within 5 minutes with the formation of red colored clear solution. The mixture is cooled to 5–10°, stirred for 5 minutes, allowed to come to room temperature and then heated under reflux for 1.5 hours. The excess of acrylonitrile is removed in vacuo; the residue is extracted with 3-350 ml. portions of diethyl ether; the combined ether extracts are decolorized and concentrated to give 31.6 g. of 3-chloro-5,11-dihydrodibenzo[b,e][1,4]thiazepine - 5 - propionitrile, B.P. about 205–210° (0.2 mm.).

To the 3-chloro-5,11-dihydrodibenzo[b,e][1,4]thiazepine-5-propionitrile, 71.1 g., in 1200 ml. of dry dioxane is added 800 ml. of 30% methanolic hydrogen chloride. The solution is stirred for 72 hours; 30 ml. of water is added; the mixture is stirred for 0.5 hour, concentrated in vacuo to about 400 ml., filtered, and the filtrate concentrated to dryness in vacuo. The residue solidifies on keeping to yield methyl 3-chloro-5,11-dihydrodibenzo[b,e][1,4]thiazepine-5-propionate.

To the methyl 3-chloro-5,11 - dihydrobenzo[b,e][1,4]thiazepine-5-propionate, 25.4 g., in 2200 ml. of methanol is added a solution of 5.6 g. of potassium hydroxide in 300 ml. of water. The mixture is heated under reflux for 4 hours, and then is concentrated in vacuo. The residue is taken up in 600 ml. of water, cooled, and then acidified with 2% aqueous hydrochloric acid. The solid is filtered and recrystallized from benzene to yield about 21.1 g. of 3-chloro-5,11 - dihydrodibenzo[b,e][1,4]thiazepine-5-propionic acid.

(B) 11 - chloro - 1,2 - dihydro-3H,8H-quino[1,8-ab][4,1]-benzothiazepin-3-one: 3 chloro - 5,11-dihydro[b,e][1,4]thiazepine-5-propionic acid, 3.7 g., is dissolved in 20 ml. of benzene and to the solution at 20° is added dropwise, 2.8 g. of trifluoroacetic anhydride. The reaction mixture is heated under reflux for 5 minutes, poured into 250 ml. of cold water, and extracted with 150 ml. of benzene. The benzene solution is concentrated to dryness, and the residue is recrystallized from 2-propanol to give about 2.3 g. of product.

(C) 11-chloro - 1,2 - dihydro - 3H,8H-quino[1,8-ab][4,1]benzothiazepin-3-one, oxime: A solution of 28.0 g. of 11 - chloro - 1,2-dihydro-3H,8M-quino[1,8-ab][4,1] benzothiazepin-3-one and 13.6 g. of hydroxylamine hydrochloride in 600 ml. of warm 70% ethanol is refluxed for 4 hours, and kept at room temperature to give a pale yellow crystalline solid. This is filtered and recrystallized from 70% ethanol to give 21.0 g. of the oxime.

(D) N - [11-chloro - 2,3 - dihydro-1H,8H-quino[1,8-ab][4,1]benzothiazepin - 3 - ylidene] - O - (p - dimethylaminobenzoyl)hydroxylamine, maleate salt (1:1): To a suspension of 9.5 g. of 11-chloro-1,2-dihydro - 3H,8H-quino[1,8-ab][4,1]benzothiazepin-3-one, oxime in 120 ml. of toluene, is added 1.4 g. of 50% sodium hydride and the mixture is heated under reflux for 1 hour, then cooled to 10–15° and to this is added, dropwise, a solution of 6.0 g. of ethyl (p-dimethylamino)benzoate in 30 ml. of toluene. The suspension is heated under reflux for 10 hours and concentrated to dryness in vacuo to give 16.0 g. of residue. This is recrystallized from benzene to give about 9.9 g. of product, as the base. The base, in ethanol is treated with an ethanol solution of maleic acid to give the maleate salt (1:1).

EXAMPLE 3

N-[11 - chloro - 2,3 - dihydro-1H,7H-quino[8,1-cd][1,5] benzoxazepin-3-ylidene] - O - (4-acetaminobenzoyl)hydroxylamine To a solution of 5.0 g. of 11-chloro-2,3-dihydro-1H,7H-quino-[8,1-cd][1,5]benzoxazepin-3-one, oxime (prepared as per the procedure of Example 1 parts A to C employing as the starting material 5,11-dihydro-7-chloro-dibenz[b,e][1,4]oxazepine in lieu of the corresponding 7-(trifluoromethyl) compound in 100 ml. of benzene is added 4.0 g. of triethylamine and cooled to 10°. To this is added a solution of 4.0 g. of 4-acetamidobenzoyl chloride in 30 ml. of benzene. The mixture is heated under reflux for 5 hours, cooled and filtered. The filtrate is washed, dried and concentrated to dryness in vacuo. The residue is recrystallized from benzene to give 7.1 g. of the product.

EXAMPLES 4 TO 15

Employing the procedures described in Examples 1(A), 1(B) and 1(C) but substituting the starting material shown in column A of Table I below, the 3-one, oxime in column B is obtained; by reacting the 3-one, oxime with the compound shown in column C as per Example 1(D), the product shown in column D is obtained.

TABLE I

| Ex. No. | Column A<br>Starting material | Column B<br>3 or 3'-one, oxime | Column C<br>R—C(=O)—Q | Column D<br>Product |
|---|---|---|---|---|
| 4 | (structure) | (structure) | CH₃C(=O)Cl | (structure) |
| 5 | (structure) | (structure) | C₆H₅C(=O)Br | (structure) |
| 6 | (structure) | (structure) | 4-F-C₆H₄-C(=O)Cl | (structure) |
| 7 | (structure) | (structure) | 4-O₂N-C₆H₄-C(=O)Br | (structure) |

TABLE I—Continued

| Ex. No. | Column A<br>Starting material | Column B<br>3 or 3'-one, oxime | Column C<br>R—C(O)—Q | Column D<br>Product |
|---|---|---|---|---|
| 8 | | | | |
| 9 | | | | |
| 10 | | | | |
| 11 | | | | |

TABLE I—Continued

| Ex. No. | Column A<br>Starting material | Column B<br>3 or 3'-one, oxime | Column C<br>R—C(=O)—Q | Column D<br>Product |
|---|---|---|---|---|
| 12 | | | | |
| 13 | | | | |
| 14 | | | | |
| 15 | | | | |

EXAMPLES 16 TO 22

Employing the procedure described in Example 2(D), but substituting the starting material shown in column A of Table II below, the 3-one, oxime in column B is obtained; by reacting the 3-one, oxime with the ester shown in column C, the product shown in column D is obtained.

TABLE II

| Ex. No. | Column A<br>Starting material | Column B<br>3 or 3′-one, oxime | Column C<br>$R-\overset{O}{\underset{\|}{C}}-OR^1$ | Column D<br>Product |
|---|---|---|---|---|
| 16 | [structure] | [structure] | $(CH_3)_2NCH_2CH_2\overset{O}{\underset{\|}{C}}OC_2H_5$ | [structure] |
| 17 | [structure] | [structure] plus [structure] | [structure] | [structure] plus [structure] |
| 18 | [structure] | [structure] | [structure] | [structure] |

TABLE II—Continued

| Ex. No. | Column A<br>Starting material | Column B<br>3 or 3'-one, oxime | Column C<br>$R-\overset{O}{\underset{\|}{C}}-OR^1$ | Column D<br>Product |
|---|---|---|---|---|
| 19 | (structure) | (structure) | (CH₃)₂N—C₆H₄—CO₂C₂H₅ | (structure) |
| 20 | (structure) | (structure) | pyridine-CO₂CH₃ | (structure) |
| 21 | (structure) | (structure) | C₆H₅CH₂COC₂H₅ | (structure) |
| 22 | (structure) | (structure) | C₆H₅C(O)OCH₃ | (structure) |

What is claimed is:

1. A compound having the structure

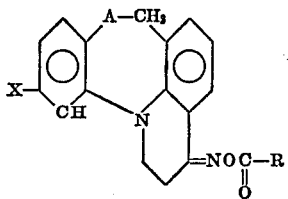

wherein A is O or S, X is trifluoromethyl or chloro and R is p-dimethylaminophenyl, 3,4,5-trimethoxyphenyl, or 4-acetaminophenyl, and a non-toxic acid-addition salt thereof.

2. A compound in accordance with claim 1 wherein A is O.

3. A compound in accordance with claim 1 wherein A is S.

4. The compound in accordance with claim 1 having the structure

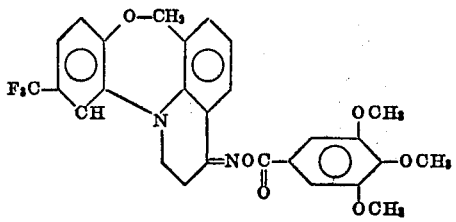

5. A compound having the structure

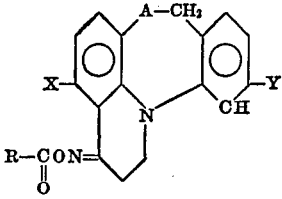

wherein A is O or S, X and Y are the same or different and are hydrogen or chloro, at least one of X and Y being hydrogen, and R is p-dimethylaminophenyl, 3,4,5-trimethoxyphenyl, or 4-acetaminophenyl, and a non-toxic acid-addition salt thereof.

6. A compound in accordance with claim 5 wherein A is O.

7. A compound in accordance with claim 5 wherein A is S.

8. A compound in accordance with claim 3 having the structure

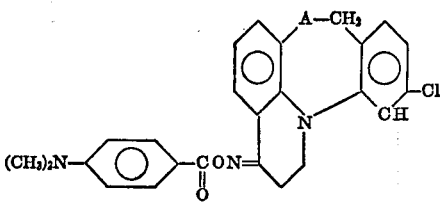

References Cited
UNITED STATES PATENTS 2,919,271  12/1959  Craig _____ 260—283 SY
3,676,445  7/1972  Yale et al. _____ 260—288 R DONALD G. DAUS, Primary Examiner U.S. Cl. X.R.

260—283 CN, 283 S, 203 SY, 283 SY, 288 R, 289 R, 293.85, 293.88, 999; 252—106